United States Patent

Linzmeier

[15] 3,669,464
[45] June 13, 1972

[54] MATERIAL CART

[72] Inventor: Leonard J. Linzmeier, 244 Bird Street, Sun Prairie, Wis. 53590

[22] Filed: Aug. 10, 1970

[21] Appl. No.: 62,436

[52] U.S. Cl............................280/47.34, 211/49, 214/10.5, 280/47.35, 280/79.3
[51] Int. Cl.........................................................B62b 3/10
[58] Field of Search..............280/79.3, 79.1, 47.19, 47.35, 280/47.34; 296/3; 214/10.5; 293/38, 41; 211/49, 50

[56] References Cited

UNITED STATES PATENTS

| | | | |
|---|---|---|---|
| 1,677,476 | 7/1928 | Hagadone | 296/3 |
| 2,247,519 | 7/1941 | Pace | 211/49 |
| 2,764,419 | 9/1956 | Enders | 280/79.1 X |
| 2,632,567 | 3/1953 | Richtmyer | 214/10.5 X |
| 3,137,250 | 6/1964 | Hutchinson | 280/47.34 X |
| 3,021,011 | 2/1962 | Visneski | 280/79.1 X |

FOREIGN PATENTS OR APPLICATIONS

| | | | |
|---|---|---|---|
| 668,966 | 7/1929 | France | 280/79.1 |

*Primary Examiner*—Benjamin Hersh
*Assistant Examiner*—Winston H. Douglas
*Attorney*—Joseph G. Werner, Theodore J. Long, John M. Winter and James A. Kemmeter

[57] ABSTRACT

A material handling car that automatically aligns elongate material pieces that are dropped thereon. The cart has a substantially horizontal wheel-supported bed having end members connecting a pair of side members. Guide rails, that automatically align the material pieces dropped on the cart, are attached to the end members inwardly of the side members and extend upwardly and outwardly from their points of attachment.

1 Claim, 2 Drawing Figures

PATENTED JUN 13 1972

3,669,464

INVENTOR:
LEONARD J. LINZMEIER
ATTORNEYS

MATERIAL CART

BACKGROUND OF THE INVENTION

1. Field of the Invention.

This invention relates to an improved material handling cart, and more specifically to a cart that automatically aligns elongate material pieces that are dropped thereon.

2. Description of the Prior Art.

Material handling carts of various designs have been invented in the past. However, none of these carts have any provision for automatically aligning material pieces as they are dropped thereon. If the material pieces are manually piled or loaded onto the cart, the men doing the loading can align the pieces and an automatic aligning feature is unnecessary. However, in today's mechanized industries, it is often desirable that steps such as the manual loading of material onto a handling car be eliminated. However, when elongate material pieces are mechanically dropped onto a cart from a machine or component cutter, it is often necessary that pieces be manually aligned in their elongate direction so that the pieces do not become crossed.

SUMMARY OF THE INVENTION

Generally, my invention comprises a cart for automatically aligning elongate material pieces that are dropped thereon. The material pieces self pile themselves and substantially align themselves in longitudinal direction.

These objects are accomplished by my cart which has guide rails that the elongate material pieces fall onto when dropped from a component cutter or other machine. The guide rails are angled so that, as each piece is dropped onto the cart, the guide rails automatically longitudinally align the pieces and cause them to tumble or roll along their longitudinal axes so that the pieces will self pile to a continuous substantially level heighth across the width of the cart.

Other objects, features and advantages to my invention will be apparent from the following detailed description taken in conjunction with the accompanying drawings.

DESCRIPTION OF THE PREFERRED EMBODIMENT

Figure 1:
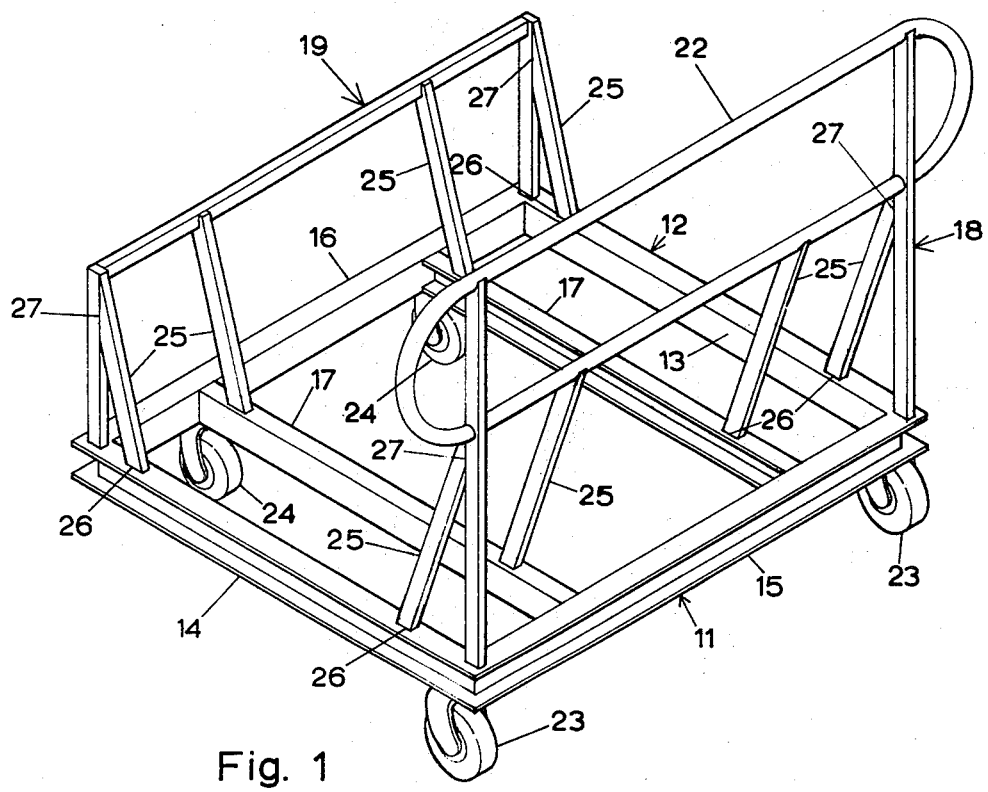
FIG. 1 is a perspective view showing the preferred embodiment of my invention.

Referring now more particularly to the drawings wherein like numerals refer to like parts throughout the several views, my cart is generally shown as 11. Cart 11 generally comprises a substantially horizontal bed 12 having a pair of end members 13 and 14 connecting a pair of substantially parallel side members 15 and 16. Intermediate and substantially parallel to end members 13 and 14 are additional bed forming members, shown as 17, that also connect to side members 15 and 16.

Side rails 18 and 19 are attached to and extend upward from side members 15 and 16 respectively. Side rail 19 is lower in heighth than side rail 18 so that it is adapted to fit against the side of or under a component cutter, such as is shown by 20, so that elongate material pieces, such as are shown by 21, can be dropped from the cutter onto the cart. This lower rail also facilitates the removing of the elongate material over the side rail as it does not have to be lifted very high to unload the material over the side. Side rail 18 is higher than side rail 19 to facilitate general maneuvering of the cart, and is adapted with a handrail 22.

Bed 12 is supported by two pairs of swivel wheels, 23 and 24. In the preferred embodiment, one pair of wheels is mounted further apart than the second pair of wheels. As shown in FIG. 1, the pair of wheels 23 are mounted under side member 15 one each at the points of connection of side member 15 to end members 13 and 14. The other pair of wheels 24 are mounted under side member 16 inwardly of the points of connection of said member 16 to end members 13 and 14. In the preferred embodiment, the pair of wheels with the greater distance between them is mounted under the side member to which the higher side rail is attached, as shown by pair of wheels 23. The other pair of wheels 24, which are closer together than pair of wheels 23, facilitate steering the cart.

Figure 2:
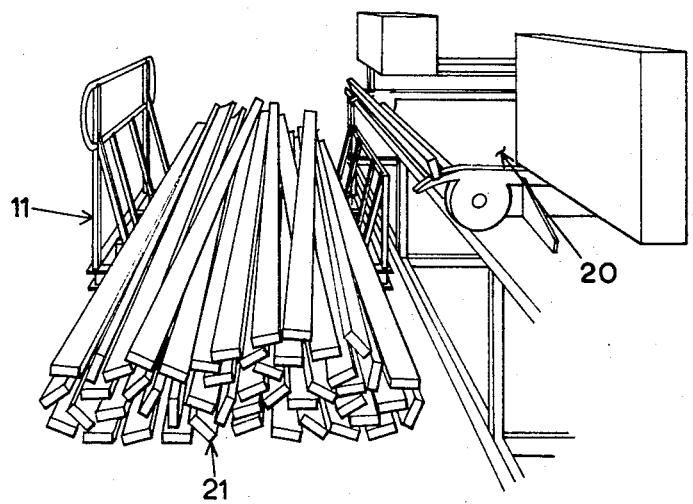
FIG. 2 is a perspective view showing the preferred embodiment of my invention with elongate material pieces that have self aligned themselves after dropping onto the cart from a component cutter alongside the cart.

Guide rails, shown as 25, are attached at their lower ends 26 to the end members 13 and 14, inwardly of side members 15 and 16. The guide rails extend upward and outward from their points of attachment to said end members and are attached at their upper ends 27 to side rails 18 and 19, thereby forming substantially rigid, angled guide rails. When elongate material pieces, such as the lumber shown generally by 21, are dropped onto my cart from a component cutter, such as a saw, as shown by 20, they will first strike guide rails 25. The guide rails will catch and retain the elongate material pieces, and cause them to tumble or roll substantially about their longitudinal axes so that the elongate material pieces will self-pile and automatically align themselves longitudinally as shown in FIG. 2.

I claim:

1. A cart for automatically aligning elongate material pieces dropped thereon, comprising:
   a. a substantially horizontal rectangular shaped wheel-supported bed having a pair of end members connecting a pair of substantially parallel side members,
   b. a first side rail mounted on and extending vertically upward from one of said side members and having a horizontal top member,
   c. a second side rail mounted on and extending vertically upward from the other of said side members, said second side rail having a generally horizontally extending handrail disposed substantially higher than the horizontal top member of said first side rail,
   d. a first pair of inclined guide rails having their lower ends fixedly mounted to said end members inwardly of said one side member and extending upwardly and outwardly to fixed attachment at their upper ends to said horizontal top member, and
   e. a second pair of inclined guide rails having their lower ends fixedly mounted to said end members inwardly of said other side member and spaced from said first guide rails and extending upwardly and outwardly to fixed attachment at their upper ends to said second side rail substantially below said handrail.

* * * * *